United States Patent [19]
Yoshimura

[11] Patent Number: 4,997,121
[45] Date of Patent: Mar. 5, 1991

[54] NOZZLE OF SOLDER SUCTION DEVICE

[75] Inventor: Hiroshi Yoshimura, Osaka, Japan

[73] Assignee: Hakko Corporation, Osaka, Japan

[21] Appl. No.: 440,606

[22] Filed: Nov. 20, 1989

[30] Foreign Application Priority Data

Jun. 29, 1989 [JP] Japan .................. 1-76493[U]

[51] Int. Cl.$^5$ ............................................. B23K 3/03
[52] U.S. Cl. .......................................... 228/20; 228/54
[58] Field of Search ............................ 228/20, 54, 55

[56] References Cited

U.S. PATENT DOCUMENTS

| 2,324,802 | 7/1943 | Powell | 228/54 |
| 4,424,930 | 1/1984 | Wilhelmson | 228/54 |

FOREIGN PATENT DOCUMENTS 674661 6/1952 United Kingdom ............... 228/54

*Primary Examiner*—Kenneth J. Ramsey
*Attorney, Agent, or Firm*—Mason, Fenwick & Lawrence

[57] ABSTRACT

A nozzle of a solder suction device maintaining wettability with solder, excellent in corrosion resistance and heat transfer property, and optimal for solder removal work of electronic components such as integrated circuits. It is composed of a nozzle base made of material excellent in heat transfer property, and a material excellent in wettability with solder, corrosion resistance and heat transfer property, and it is integrally fixed with the nozzle tip member having a solder suction hole, and the inserting part of the nozzle tip member is inserted into the throughhole in the nozzle tip member, and a plating layer is applied and formed on the outer circumferential surface of the tip side on both sides of the plating boundary in the middle between the outer circumferential tip of the nozzle tip member and the outer circumferential tip of the nozzle base body, while a coverying layer made of material inferior in wettability with solder is applied and formed on the base end side outer circumferential surface, so that the wettability of the nozzle tip member and solder is maintained if used for a long time or many times, and that the corrosion of the portion directly contacting with the solder or flux may be prevented, thereby effectively preventing lowering of heat transfer property.

9 Claims, 6 Drawing Sheets

NOZZLE OF SOLDER SUCTION DEVICE

BACKGROUND OF THE INVENTION

1. Field of the Invention

The present invention relates to a nozzle of a solder suction device, and more particularly to a nozzle of a solder suction device particularly optical for solder removal job of electronic parts such as integrated circuits, capable of maintaining wettability with solder for a long time and many times of use, and excellent in corrosion resistance and heat transfer property.

2. Description of the Prior Art

A solder suction device is used for detaching a part soldered to a specific position or sucking the residual solder after detaching such parts, and it comprises a nozzle for sucking solder disposed at the front end portion, in addition to heating means such as heater and suction means such as vacuum pump.

Various structures have been proposed hitherto for this nozzle, including the one disclosed in the Japanese Utility Model Publication No. 48-59722. In this nozzle, a rear end part of an iron-made tube having a suction port at the tip is press-fitted into a stainless steel thin-wall pipe, and this thin-wall pipe is inserted into the copper-made iron tip main body so as to be formed firmly with this iron tip main body into one body. On the outer exposed portion of this iron tip main body, a chrome plating layer is applied and formed to apply heat resistant, rust preventive treatment, while a solder coating layer is applied and formed on the outer exposed portion of the tube to maintain wettability with the solder.

Thus, when using this solder suction device, the nozzle heated by the heating means is abutted against the solder to be removed. As a result, the solder is heated and melted by the nozzle heated to high temperature, and is sucked inside from the suction port of the nozzle by the suction means, and is reserved in a reserve tank with filter installed in the midst of suction route.

However, in such conventional nozzle structure, the following problems occurred, and their improvements have been demanded.

More specifically, in the nozzle in such structure, while repeating the solder removal jobs, when the suction means is operated by fitting the tip of the heated nozzle to the portion to be melted, that is, to the solder to be removed, the tip temperature of the nozzle may drop suddenly. As a result, the solder could not be melted sufficiently, and it could not be sucked in certain cases. To the contrary, considering such temperature drop to avoid such situation, if the initial heating temperature is kept at a higher level so as to melt the solder sufficiently even after drop, the heat above the permissible temperature is applied to the soldered parts, and the constituent parts of the heating means themselves may be damaged.

In particular, along with the rapid advancement in the electronics industry handling integrated circuits (or ICs) recently, the solder suction devices come to be used widely in solder removal jobs of such electronic components, and these problems have become very serious.

That is to say, strict permissible ranges are designated for heating temperature of these electronic components so as not to sacrifice their characteristics, and the use of solder suction device exceeding such permissible range is not allowed. Consequently, strict conditions are required for the heating temperature of the nozzle, and a very high precision is needed in its temperature control, but it was no longer possible to satisfy such strict conditions by the conventional nozzle structure stated above.

To solve the problems of the existing nozzle structure, the present inventors intensively tested and researched about the cause of the temperature drop, and discovered that the solder coating layer of the tube surface is melted by the heating temperature in the course of use for a long period or many times, and that the molten solder or flux corrodes the tip part of the iron main body, thereby forming a gap inside the chrome plated layer. This gap acts as an adiabatic layer between the iron tip main body and the tube, so that the heat transmission efficiency of the two is extremely lowered. As a consequence, the tip part heat of the tube is deprived of by the solder to be melted, and when the heating temperature is lowered, enough heat for raising the heating temperature to specified level is not supplemented, so that the temperature drop of the nozzle occurs.

BRIEF SUMMARY OF THE INVENTION

The invention is devised in the light of the above-discussed problems of the prior art, and it is hence a primary object of the invention to present a novel nozzle of a solder suction device solving the above problems.

It is other object of the invention to present a nozzle of a solder suction device capable of transmitting the heat from heating means efficiently to the tip part of the nozzle, excellent in wettability of solder, and preventing corrosion by solder or flux.

It is another object of the invention to present a nozzle of a solder suction device wherein the inside surface of the penetration hole of the nozzle base body is securely protected from corrosion by solder or flux, and the heat transfer from the nozzle base body to the nozzle tip member is effected at a small loss.

It is a different object of the invention to present a nozzle of a solder suction device wherein adhesion of molten solder to the junction part of the nozzle base body and nozzle tip member is completely prevented, so that corrosion from the junction surface of the nozzle base body and nozzle tip member is prevented.

It is a further different object of the invention to present a nozzle of a solder suction device wherein the wettability between the tip part of the nozzle tip member and the solder is excellent where the molten solder oozes out onto the circumference of the nozzle when the tip of the nozzle is pressed against the solder to be melted, and the heat of the nozzle tip member is efficiently transmitted to the solder to be melted, so that the solder oozing out around the nozzle is not solidified and left over.

To achieve the above objects, the nozzle of solder suction device of the invention comprises a nozzle base body made of a material excellent in heat transfer property, and a nozzle tip member made of a material excellent in wettability with solder, corrosion resistance and heat transfer property, being affixed to the tip part of the nozzle base body, wherein the nozzle base body possesses a penetration hole running through from its tip to the base end, the nozzle tip member possesses the head affixed to the tip of the nozzle base body and an insertion part to be inserted into the penetration hole in the nozzle base body, together with a solder suction hole penetrating through the head and insertion part, a plating boundary is disposed in the intermediate part between the outer circumference front end of the nozzle tip member and the outer circumference front end of the nozzle base body, a solder plating layer is applied and formed from the plating boundary to the front end side outer circumferential surface, and a coating layer made of a material inferior in wettability to solder is applied and formed from the plating boundary to the base end side outer circumferential surface.

These and other objects of the invention, as well as the features and advantages thereof, will be better understood and appreciated from the following detailed description taken in conjunction with the accompanying drawings and novel items indicated in the claims.

BRIEF DESCRIPTION OF THE DRAWINGS

FIG. 6 (a), (b) and FIG. 7 (a), (b) are temperature characteristic diagrams showing temperature changes of the nozzle part when the solder is sucked by the solder suction device.

DETAILED DESCRIPTION OF THE PREFERRED EMBODIMENTS

Embodiment 1

Figure 1:
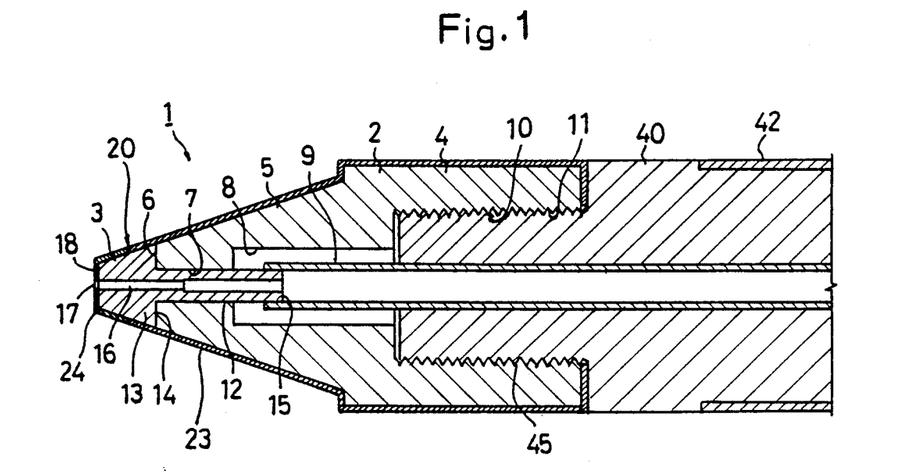
FIG. 1 is a sectional view showing a nozzle of a solder suction device in a first embodiment of the invention.
Figure 2:
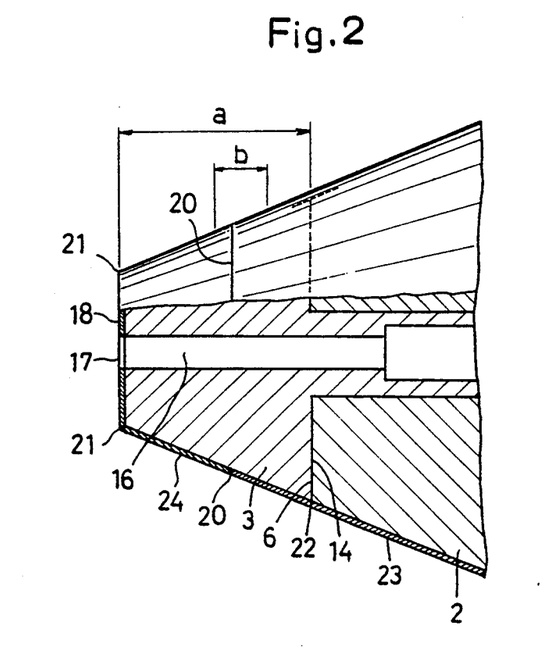
FIG. 2 is an enlarged sectional view of essential parts of the same nozzle.
Figure 3:
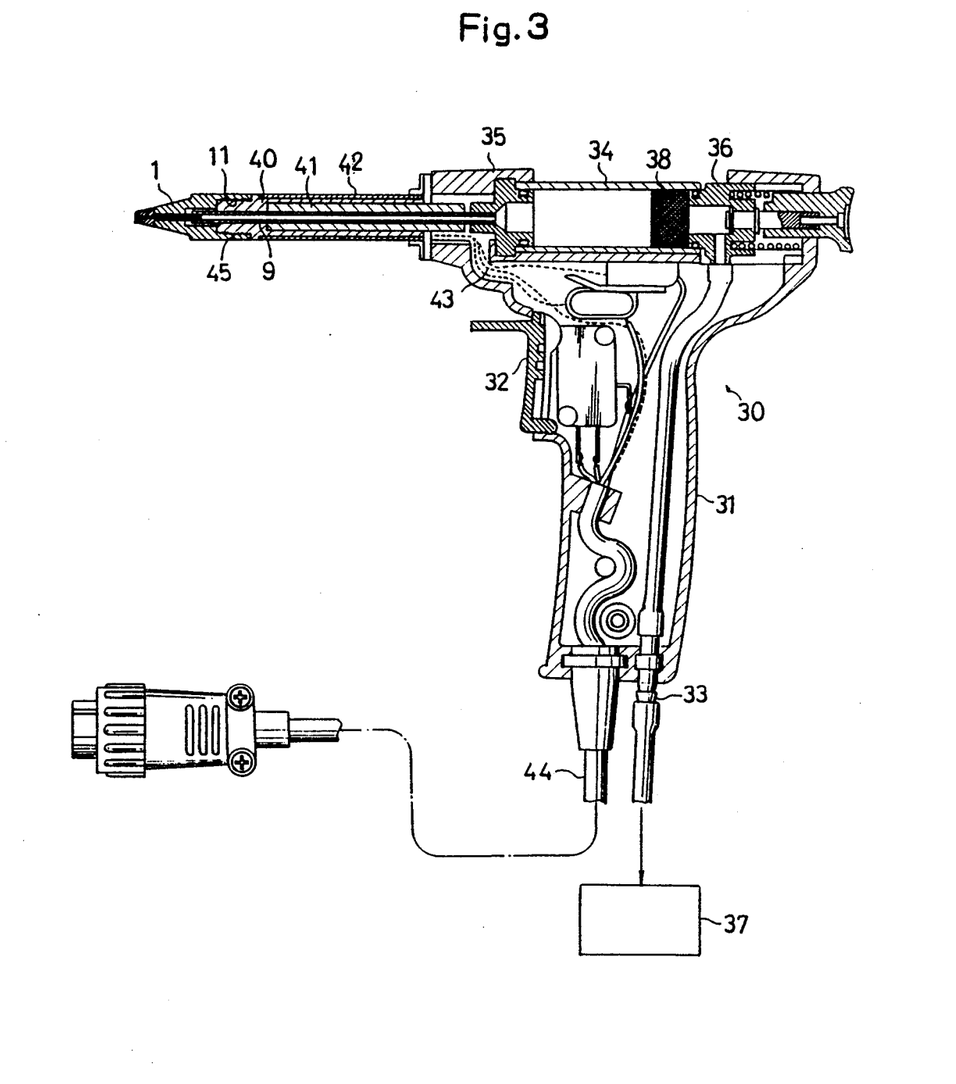
FIG. 3 is a sectional view showing a solder suction device having the same nozzle.

The nozzle of solder suction device according to the first embodiment of the invention is shown in FIG. 1 and FIG. 2, in which the nozzle 1 is composed of a nozzle base body 2 made of copper excellent in heat transfer property, and a nozzle tip member 3 made of iron excellent in wettability with solder, corrosion resistance and heat transfer property, and it is detachably affixed to the front end of the solder suction device 30 shown in FIG. 3.

The nozzle base body 2 has its base end part 4 formed in a columnar body, and its front end part 5 is in a truncated conical form, and the front end face 6 of the front end part 5 is a circular plane. In the central part of the nozzle base body 2, a penetration hole 7 is running through from its front end to the base end along the axial center of the nozzle base body 2. The inside diameter of the penetration hole 7 is set relatively small at its front end part, and larger in two steps as going backward to the intermediate part 8 and rear end part 10. In the intermediate part 8, the base end part of the nozzle tip member 3 is detachably inserted into the front end part of a suction pipe 9 of the suction device 30. Female threads 11 are cut in the inner surface of the rear end part 10.

The base end part of the nozzle tip member 3 is formed in a tubular shape in a diameter suited to the front end part of the penetration hole 2 in the nozzle base body 2, and an insertion part 12 of the nozzle tip member 3 is formed. The head 13 of the nozzle tip member 3 is formed in a larger diameter than the insertion part 12, and its outer circumference is tapered and smaller in diameter at the end continuous to the outer circumference of the nozzle base body 2, and its base end face 14 is an abutting shoulder to contact with the front end plane 6 of the nozzle base body 2. When the insertion part 12 of the nozzle tip member 3 is inserted into the front end part of the penetration hole 7, the abutting shoulder 14 of the head 13 is in tight contact with the front end face 6 of the nozzle base body 2, and the base end part 15 of the insertion part 12 projects into the intermediate part 8.

A solder suction hole 16 is formed in the nozzle tip member 3 by penetrating through the head 13 and insertion part 12, and the front end of the solder suction hole 16 is formed as a suction port 17 opening to the front end face 18 of the head 13. The front end face 18 is formed in a circular plane.

The peripheral surface of the insertion part 12 is in tight contact with the inside of the front end part of the penetration hole 7 of the nozzle base body 2, and the abutting shoulder 14 of the head 13 is in tight contact with the front end face 6 of the nozzle base body 2, and the nozzle end member 3 is soldered and affixed to the nozzle base body 2 with silver solder. After the nozzle base body 2 and the nozzle tip member 3 are combined into one body by soldering and affixing, these circumferential surfaces are integrally ground to be formed into a smooth conical (taper) surface as shown in the drawing.

Numeral 20 denotes a plating boundary, and the plating boundary 20 is formed in the intermediate part between the outer circumferential end 21 of the nozzle tip member 3 and the outer circumferential end 22 of the nozzle base body 2 as shown in FIG. 2. On the outer circumference of the base end side from the plating boundary 20, a chrome plating layer 23 is formed.. On the other hand, on the surface of the front end side from the plating boundary 20, a solder plating layer 24 is applied and formed. Instead of the chrome plating layer 23, it may be also possible to apply and form other coating layer made of a material inferior in wettability to solder, and for example, heat resistant coating layer or ceramic coat film layer may be preferably used.

Besides, since the head 13 is made of iron, it is desired to shape in a minimum required size in order to enhance the heat conductivity as far as possible. Accordingly, in the illustrated example, the axial thickness a (FIG. 2) of the head 13 is set in a range of 1.5 to 3 mm. This is because, if the axial thickness a is smaller than 1.5 mm, the axial width of the chrome plating layer 23 formed on the outer circumference of the head 13 is too narrow to protect the nozzle base body 2, and if larger than 3 mm, the heat transfer from the nozzle base body 2 to the front end face 18 of the nozzle tip member 3 is insufficient, and unfavorable results are brought about in both cases.

Furthermore, the plating boundary 20 is shifted more than 0.75 mm toward the front end side from the outer circumferential front end 22 of the nozzle base body 2, and it should be preferably positioned in a range b (FIG. 2) of 50 to 70% of the axial thickness a of the head 13 from the outer circumferential front end 21 of the nozzle tip member 3.

Next, the structure of the solder suction device 30 using this nozzle 1 is explained while referring to FIG. 3.

Numeral 31 notes a main body case, which is formed like a pistol. Numeral 32 is a vacuum suction switch, and by pressing it, a vacuum pump 37 outside the main body case 31 is put in action, and a reserve tank 34 is decompressed through a vacuum tube connection port 33.

The reserve tank 34 is a transparent tubular body made of heat resistant glass or the like so that the inside may be observed from outside, and it is detachably placed between a front holder 35 and a rear holder 36. The reserve tank 34 also has a filter 38 made of glass wool.

The rear end of the suction pipe 9 is inserted into the front holder 35. This suction pipe 9 is made of stainless steel. The barrel portion of the main body case 31 is composed of a copper made heating core 40 having the suction pipe 9 penetrated in the inner hole, a ceramic heater 41 disposed inside, and a protective pipe 42 covering the outer circumference of the heating core 40 and ceramic heater 41, and it is attached to the front side portion of the main body case 31. Numeral 43 is a lead wire of the heater 41, and it is connected to a power cord 44, and when this power cord 44 is plugged into a power outlet (not shown), the ceramic heater 41 is heated.

Besides, as shown in FIG. 1, male threads 45 are cut in the front end portion of the heating core 40, and the female threads 11 of the nozzle 1 are engaged therewith, and the insertion part 12 of the nozzle tip member 3 of the nozzle 1 is inserted into the front end portion of the suction pipe 9 projecting from the middle of the front end of the heating core 40. Meanwhile, the front end portion of the suction pipe 9 and the insertion part of the nozzle tip member 3 are inserted in a mutually extractable manner without any affixing means such as soldering. As a result, the nozzle 1 can be detached from the front end portion of the solder suction device 30 so as to be replaced.

Figure 4:
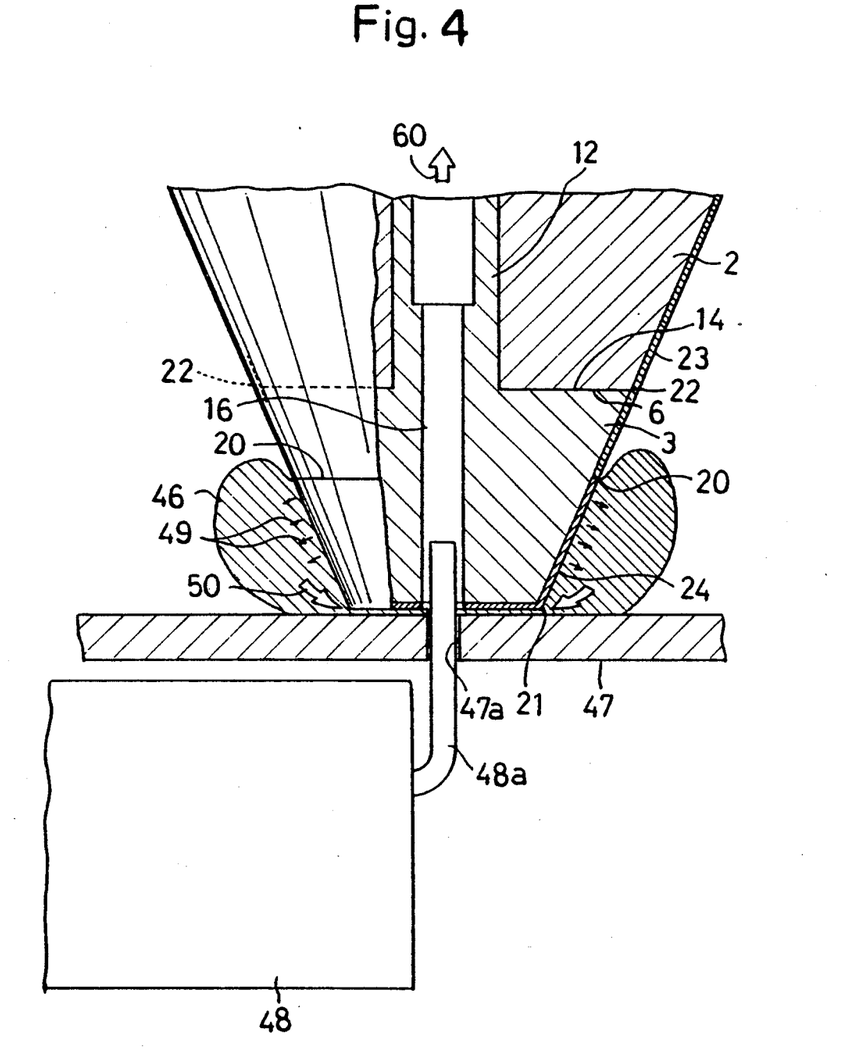
FIG. 4 is a sectional view showing the state of the tip part of the nozzle when sucking and removing the solder as required by the same solder suction device.

The solder removal job by the solder suction device 30 having the nozzle 1 of the invention is explained by referring to FIG. 4. A component 48 shown in FIG. 4 is an electronic part, and its lead 48a is inserted into an insertion hole 47a of a printed circuit board 47 from the lower side, and is also soldered to the conductor (not shown) on the printed circuit board 47.

By heating of the ceramic heater 41, the nozzle 1 is heated to a specified temperature through the heating core 40, and then when this nozzle 1 is abutted against the solder 46 to be removed on the printed circuit board 47, this solder 46 is heated and melted by the nozzle 1 heated to high temperature. In this state, when the vacuum suction switch 32 is operated, the vacuum pump 47 is actuated, and the molten solder 46 is sucked into the suction port 17 of the nozzle 1 as indicated by arrow 50, and is further sucked into the suction pipe 9 as indicated by arrow 60 through the insertion part 12, and is stored in the reserve tank 34 installed in the suction passage.

At this time when the solder 46 is melted by pressing the front end of the nozzle 1 to the solder 46, the molten solder 46 oozes out on the circumference of the nozzle 1 as shown in FIG. 4, but since the solder plating layer 24 is applied and formed on the outer surface at the front end side from the plating boundary 20 of the nozzle 1, the wettability to solder in this area is excellent. Therefore, the heat of the nozzle 1 is transmitted very efficiently also to the solder 46 oozing out on the periphery, so that the solder 46 may not be solidified and left over as experienced in the prior art.

Embodiment 2

Figure 5:
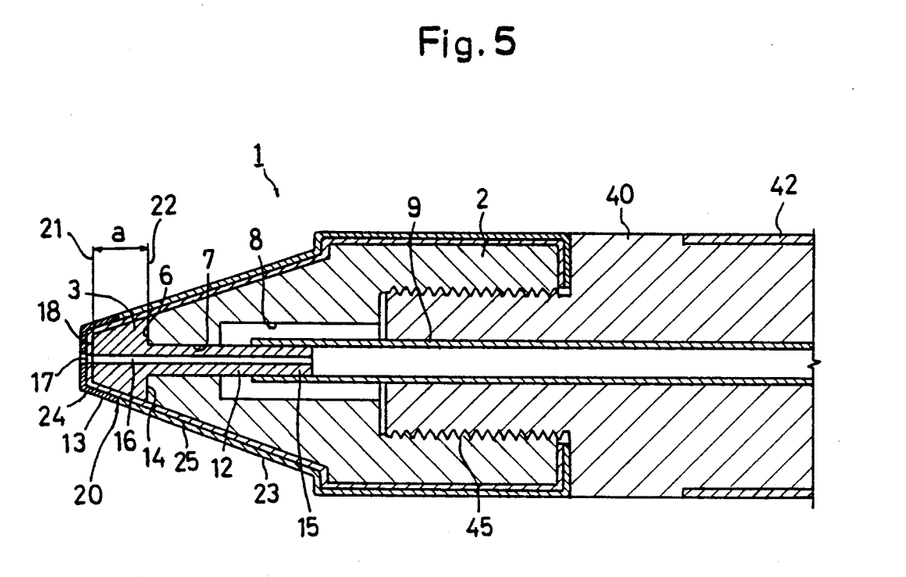
FIG. 5 is a sectional view corresponding to FIG. 1, showing a nozzle of a solder suction device in a second embodiment of the invention.

FIG. 5 shows the second embodiment, in which the nozzle tip member 3 is soldered and affixed to the nozzle base body 2, its outer circumference is finished, and an iron plating layer 25 is applied and formed on the entire circumference from the front end face 18 of the nozzle tip member 3 to the base end face of the nozzle base body 2. On this iron plating layer 25, separated from the plating boundary 20, a solder plating layer 24 and a chrome plating layer 23 are applied and formed at the front side and rear side, respectively.

The other structure and action are same as in the first embodiment.

Figure 6A:
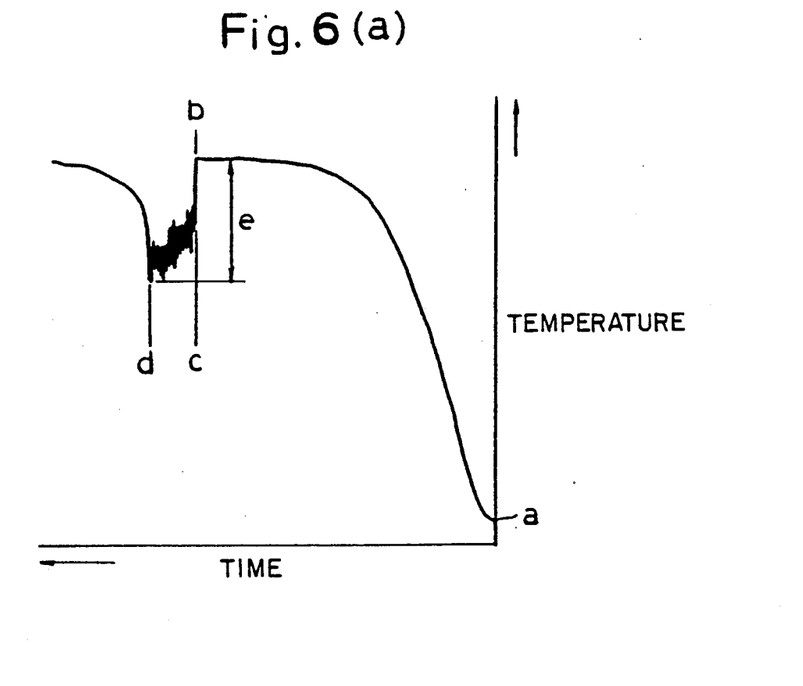
Figure 6B:
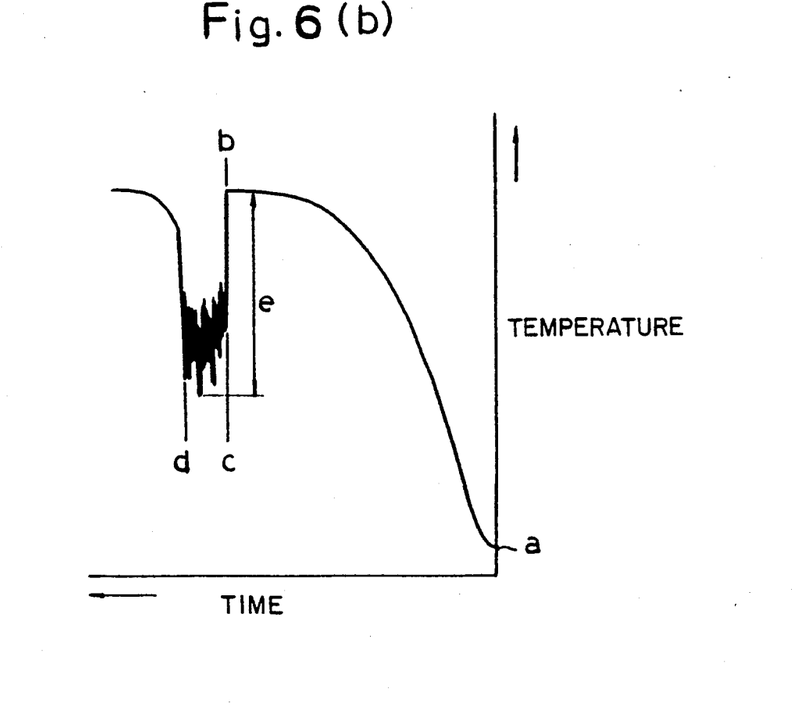
Figure 7A:
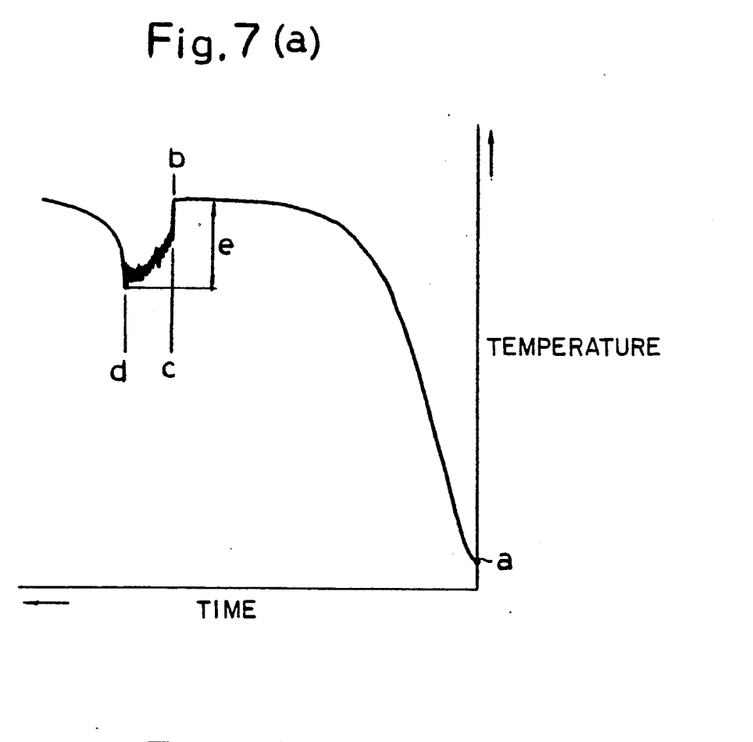
Figure 7B:
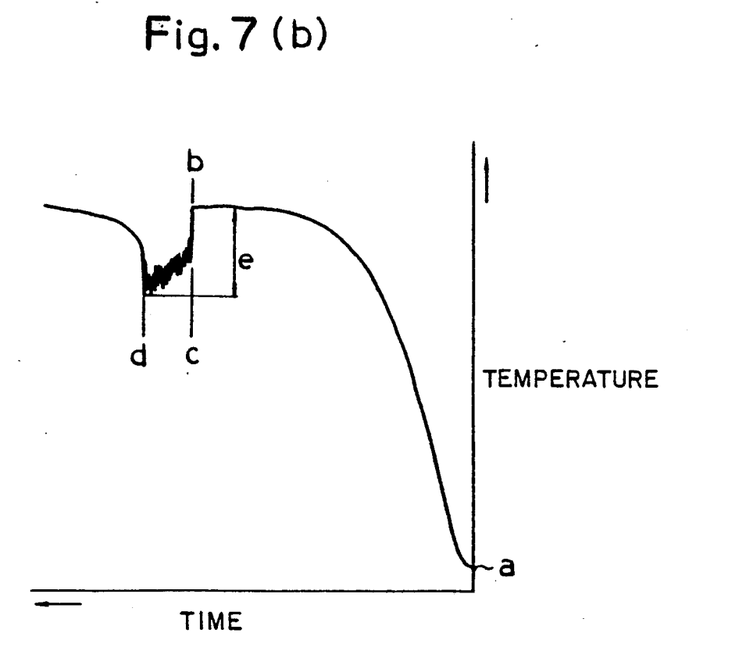

The characteristic test results conducted in order to investigate the characteristics of the nozzle 1 relating to the invention are shown in FIG. 6 and FIG. 7, in which the heat drop characteristics of the invention (by the nozzle 1 of the first and second embodiments) are shown in comparison with the performance of the prior art.

FIG. 6 shows the temperature characteristic curve of a conventional nozzle, in which FIG. 6 (a) shows the result of the initial period after start of use, and FIG. 6 (b) is the performance after 500 times of use. On the other hand, FIG. 7 is a temperature characteristic curve of the nozzle of the invention, showing similarly the initial performance in FIG. 7 (a) and the result after 500 times of use in FIG. 7 (b).

In these diagrams, point a denotes the ordinary temperature, and point b shows the point after heating of the test nozzle is over by turning on the power, and the interval from point c to point d is the solder suction working region. In this working region, the test nozzle contacts with the solder for 2 seconds, and suction for 1 second is effected 30 times. Symbol e denotes the margin between the temperature upon start of suction and the lowest temperature during suction.

As clear from these diagrams, in the prior art, the temperature width e was 135° C. upon start of use, and became 232° C. after 500 times of use, and the heat drop was 97° C. By contrast, in the invention, the temperature width e was 90° C. initially and 95° C. after 500 times. It is known from these test results that the heat drop of the nozzle tip is far smaller in the invention as compared with the prior art.

As described in detail herein, according to the invention, the following various excellent effects are obtained, and by the use for a long time or many times, the nozzle base body does not corrode, and the heat drop of the tip of the nozzle is small, the characteristics of electronic parts which are very susceptible to the heating temperature are not spoiled, the consituent parts of heating means such as heater are not damaged, and the nozzle of solder suction device optimal for soldering of electronic component in particular may be presented.

(1) Since the nozzle tip member is made of material excellent in wettability to solder, corrosion resistance and heat transfer property, such as iron, the wettability of solder is superior, and corrosion by solder and flux may be prevented.

(2) Since the insertion part of the nozzle tip member is fitted and affixed in the penetration hole of the nozzle base body, the inside of the penetration hole of the nozzle base body made of a material less resistant to corrosion while excellent in heat transfer property, such as copper, may be securely protected from the corrosion by solder or flux. Still more, by the fitting and affixing, the heat transfer from the nozzle base body to the nozzle tip member may be effected at a small loss.

(3) A plating boundary is disposed in the middle part between the outer circumferential end of the nozzle tip member and the outer circumferential end of the nozzle base body, and separated from this plating boundary, a solder plating layer is applied and formed on the front end side outer circumference, while a coating layer made of a material inferior in wettability to solder is applied and formed on the base end side outer circumference. Therefore, the heated and melted solder does not deposit on the base side outer circumference from the plating boundary, and corrosion from the junction of the nozzle base body and the nozzle tip member may be securely prevented.

(4) When the tip of the nozzle is pressed against the solder to be melted, the heated and melted solder oozes out on the circumference of the nozzle, but since the solder plating layer is applied and formed on this circumference, the wettability to solder is excellent in this area, and the heat of the nozzle is efficiently transmitted to the solder, so that the oozing solder is not solidified and left over.

The practical embodiments described herein are mere examples for illustrating the art of the invention, and the invention is not limited to the foregoing examples alone but should be interpreted in a wider sense including the changes and modifications falling within the scope and spirit of the invention as well as the descriptions in the claims.

What is claimed is:

1. A nozzle of solder suction device which is detachably attached to the front end of a solder suction device comprising heating means for melting solder and suction means for sucking the solder melted by the heating means, which comprises:
   a nozzle base body made of a material excellent in heat transfer property, and
   a nozzle tip member made of a material excellent in wettability with solder, corrosion resistance and heat transfer property, being affixed to the tip part of the nozzle base body, wherein
   the nozzle base body possesses a penetration hole running through from its tip to the base end, the nozzle tip member possesses the head affixed to the tip of the nozzle base body and an insertion part to be inserted into the penetration hole in the nozzle base body, together with a solder suction hole penetrating through the head and insertion part,
   a plating boundary is disposed in the intermediate part between the outer circumference front end of the nozzle tip member and the outer circumference front end of the nozzle base body, a solder plating layer is applied and formed from the plating boundary to the front end side outer circumferential surface, and a coating layer made of a material inferior in wettability to solder is applied and formed from the plating boundary to the base end side outer circumferential surface.

2. A nozzle of solder suction device according to claim 1, wherein
the nozzle base body is made of copper, and the nozzle tip member is made of iron.

3. A nozzle of solder suction device according to claim 1, wherein
the coating layer applied and formed on the base end side outer circumference from the plating boundary is a chrome plating layer.

4. A nozzle of solder suction device according to claim 1, wherein
the penetration hole of the nozzle base body is disposed running through from the front end to the base end on the axial center of the nozzle base body,
the insertion part of the nozzle tip member is formed in a tubular form that can be inserted into the penetration hole in the nozzle base body, and
the head of the nozzle tip member is formed in a larger diameter than the insertion part, and has an abutting shoulder to abut against tightly the front end face of the nozzle base body.

5. A nozzle of solder suction device according to claim 4, wherein
the penetration hole of the nozzle base body possesses a smaller diameter front end part inserting and holding the insertion part of the nozzle tip member, and a female threaded part to be engaged with a heating core of the meating means of the solder suction means, and
the insertion part of the nozzle tip member is detachably inserted into the suction pipe of the solder suction device in the penetration hole of the nozzle base body.

6. A nozzle of solder suction device according to claim 1, wherein
the nozzle base body and the head of the nozzle tip member possess narrow-end tapered outer circumferential surfaces continuous to each other.

7. A nozzle of solder suction device according to claim 1, wherein
an iron plating layer is applied and formed on the entire outer circumference of the nozzle base body and nozzle tip member, and the plating boundary is disposed on the outer circumference of the iron plating layer, and the solder plating layer is applied and formed on the front end side outer circumference from the plating boundary, while the coating layer is formed on the base end side outer circumference from the plating boundary.

8. A nozzle of solder suction device according to claim 7, wherein
the nozzle base body is made of copper and the nozzle tip member is made of iron.

9. A nozzle of solder suction device according to claim 8, wherein
the coat film layer applied and formed on the base end side outer circumference from the plating boundary is a chrome plating layer.

* * * * *